Patented May 2, 1939

2,156,721

UNITED STATES PATENT OFFICE 2,156,721

PROCESS OF TREATING HALOGENATED KETONES

Martin de Simó and Sumner H. McAllister, Berkeley, Calif., assignors to Shell Development Company, San Francisco, Calif., a corporation of Delaware No Drawing. Application October 8, 1934, Serial No. 747,422

22 Claims. (Cl. 260—488)

This invention relates to the treatment of halogenated ketones whereby valuable intermediates and organic acids may be obtained. More specifically our invention is concerned with the treatment of halogenated ketones under alkaline conditions whereby esters of ketols and carboxylic acids and/or carboxylic acids or their salts may be prepared.

For purposes of convenience the description of our invention is subdivided into two parts: the first part dealing with monohalogenated ketones, and the second part dealing with polyhalogenated ketones. This procedure is adopted in view of the different behaviorism displayed by the two sets of ketones under identical operating conditions. Conditions favoring the production of saturated compounds, including carboxylic acids—in the case of monohalogenated ketones, lead to the formation of unsaturated compounds, including carboxylic acids—in the case of polyhalogenated ketones.

We have discovered that by treatment of monohalogenated ketones with water in the presence of basic reagents, other than ammonia and its compounds, a rearrangement of the ketone molecule may be effected and a carboxylic acid or its salts produced. Besides these carboxylic acid compounds, one may obtain, under varied operating procedure, esters thereof which contain a ketonic group in the ester radical. They may be represented by the empirical formula

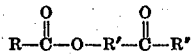

wherein R, R' and R'' are different hydrocarbon radicals, more commonly alkyl groups, which may or may not contain substituent groups or elements.

These reactions take place with particular ease with monohalogenated ketones wherein the halogen it attached to a carbon atom contiguous to the carbonyl group. We preferably employ ketones containing a halogen atom attached to a primary or secondary carbon atom. Furthermore, for the production of carboxylic acids we prefer to use ketones having a halogenated primary carbon atom as better yields are usually obtained thereby.

As suitable basic reagents for the reaction any basic acting metal compound may be used. Ammonia and its basic derivatives are undesirable as they produce an entirely different type of reaction. With ammonia or amines, for example, saturated aminoketones are formed.

The nature of the basic acting metal compound used greatly influences the course of the reaction. With strong bases such as sodium hydroxide, potassium hydroxide, calcium oxide, etc., for example, the tendency is to form good yields of acids and/or ketonic esters, but the speed of reaction is such as to produce excessive polymerization of the resulting products. With very weak basic acting compounds, such as calcium carbonate, magnesium carbonate, barium carbonate and the like, the high temperatures required to make the reaction rate practical, favor higher condensation reactions, which likewise lower the yields of the desired product. We prefer, therefore, to use basic acting compounds of intermediate activity, such, for example, as sodium carbonate, sodium bicarbonate, disodium phosphate, and the like, which not only give convenient rates of reaction at suitable temperatures, but also are relatively free from condensation difficulties. The rate of reaction appears to be a function of the hydrogen ion concentration and of the degree of concentration of the halogenated ketone in the reaction medium.

The mechanism of the reaction has not, as yet, been fully explained although it is known that ketonic esters are formed in the reaction. The hydrolysis of the ester and formation of condensation products which also takes place obscure the true course of the changes which occur. By proper choice of operating conditions, particularly in regard to choice of basic agent, as has been indicated, these secondary reactions may be controlled and conditions regulated to favor the production of free carboxylic acid or ketonic esters thereof as desired. Some ketol may also be formed.

As specific examples of monohalogenated ketones with which the reaction may be carried out are included the mono chloro, bromo, and iodo substitution products of acetone, methyl ethyl ketone, diethyl ketone, methyl propyl ketone, methyl isopropyl ketone, methyl normal butyl ketone, methyl secondary butyl ketone, methyl tertiary butyl ketone, ethyl propyl ketone, and the homologues, analogues and substitution products thereof.

With polyhalogenated ketones, of the type containing halogen on more than one carbon atom, we have found that the reaction with water in the presence of basic reagents, other than ammonia and its compounds also results in a rearrangement of the ketone molecule, but in this case unsaturated carboxylic acids are formed. The reaction may be regarded as similar to that which takes place with the monohalogenated ketones, followed by a splitting off of halogen acid with the formation of a double bond. As previously pointed out, however, the mechanism of the changes which take place are not entirely clear and we do not intend to imply that the formation of the unsaturated bond or bonds necessarily follows the rearrangement. Such an hypothesis merely offers a convenient way of describing the observed results.

For the preparation of unsaturated carboxylic acids, we preferably employ polyhalogenated ketones containing a halogen substituent attached to at least one of the carbon atoms contiguous to the carbonyl group. The reaction takes place with particular ease when such a substituent is attached to a primary carbon atom. The other halogen atom or atoms present elsewhere in the molecule may have any position and more than one halogen may be attached to the same carbon atom. It is only essential, to our invention, that halogen atoms be attached to more than one carbon atom in the ketone molecule. Furthermore, the halogen substituents may be the same, or different halogen atoms. Thus suitable polyhalogenated ketones for the preparation of unsaturated acids by our process are any of the ketones above referred to containing chlorine and/or bromine or iodine substituted on more than one carbon atom.

The influence of the basic agent on the course of the reaction is much the same as in the case of the reaction with monohalogenated ketones, and we prefer to use agents of intermediate activity such as sodium carbonate, sodium bicarbonate and the like for carrying out the reaction. The tendency to form ester products is usually not so great as with monohalogenated ketones and the formation of condensation products is less favored. Higher proportions of basic agent are required to effect equally complete conversion of the ketone as more halogen acid is liberated in the reaction.

In both reactions, the basic reagent is preferably used in an amount greater than the theoretical requirement for reaction with the halogen of the ketone. The concentration of the basic reagent used, as well as the temperature employed, influence the rate of the reaction. With very weak bases, the high temperatures required to produce reasonable reaction rates, necessitate the use of superatmospheric pressures.

For the purpose of affording a clear understanding of our invention, but without imposing limitation thereon, it will be described with more particular reference to the treatment of chlorinated methyl ethyl ketone.

The halogenated ketone, either mono or dihalogenated, is mixed with water in the presence of a basic acting metal compound (preferably present in about 20 to 60% excess of the theory) and heated to a temperature and pressure corresponding to the concentration and strength of the base used. The preferred temperature for the hydrolysis, with some of the more common basic reagents are as follows:

|  | Degrees centigrade |
|---|---|
| NaOH | About 0 to 20 |
| Ca(OH)$_2$ | About 20 to 40 |
| Na$_2$CO$_3$ | About 50 to 100 |
| CaCO$_3$ | About 95 to 160 |

Higher temperatures may, of course, be employed with these reagents, but to avoid undesirable side reactions we prefer to operate in the ranges specified.

Depending on the temperature, pressure, and the strength of base used, the reaction may be instantaneous or require several hours for completion, as indicated by the following figures for the conversion of chlor methyl ethyl ketone:

| Basic agent | Temperature | Time | Percent conversion products (by weight) |
|---|---|---|---|
|  | °C. |  |  |
| CaCO$_3$ | 100–105 | 14 hours | 47 |
| CaCO$_3$ | 140 | 90 mins. | 100 |
| Na$_2$CO$_3$ (3.8N) | 90–100 | 60 mins. | 100 |

The effect of temperature and concentration of basic agent upon the composition of the product obtained in the treatment of chlor methyl ethyl ketone is shown in the following table:

| Basic agent | Temperature | Time of conversion | Composition of product (by weight) | | |
|---|---|---|---|---|---|
|  |  |  | Isobutyric acid | Ethyl ketol | Condensed material |
|  | °C. | Hours | Percent | Percent | Percent |
| NaOH (2.5N) | 20 |  | 27.2 | 30.8 | 42.0 |
| (5N) | 20 |  | 16.4 | 13.9 | 69.7 |
| Na$_2$CO$_3$ (3.6N) | 95 | 2 | 62.5 | 16.9 | 20.6 |
| (7N) | 95 | 2 | 66.2 | 10.3 | 23.4 |
| CaCO$_3$ | 140 | 2 | 2.4 | 61.7 | 35.8 |

The yields of isobutyric acid obtained, by our process, with some of the more common basic reagents under comparable conditions are shown in the following table:

| Basic agent | Isobutyric acid (mol percent of theoretical based on chlor ketone used) | |
|---|---|---|
|  | Chlor methyl ethyl ketone (CH$_2$ClCOC$_2$H$_5$) | α Chlor ethyl methyl ketone (CH$_3$COCHClCH$_3$) |
|  | Percent | Percent |
| Na$_2$CO$_3$ and/or NaHCO$_3$ | 47–60 | 10–14 |
| Mg(OH)$_2$ and/or Ca(OH)$_2$ | 34–36 | 10 |
| NaOH | 13–24 | 4 |
| MgCO$_3$ and/or CaCO$_3$ | 2–5 | 1–3 |

The progress of the reaction may be followed by titrating samples of the reaction mixture at intervals for free alkalinity. After the reaction is completed the products may be recovered in any suitable manner, for example, the aqueous solution may be extracted by a suitable solvent to remove ketol, ester and condensation products, when present, and the acid recovered by acidification and further extraction or by distillation and the like. As suitable extracting media for removal of carboxylic acids therefrom, ether, amyl alcohols, benzol and the like water immiscible solvents may be used.

The following examples illustrate specific embodiments of our invention as applied to the production of saturated carboxylic acids, unsaturated carboxylic acids and ketonic esters. But it will be understood that similar results may be obtained by modified procedure without departing from the spirit of this invention.

*Example 1.*—2 mols (212 grams) of chlor methyl ethyl ketone were mixed with a 3.6 normal solution of 1.6 mols of Na$_2$CO$_3$ (170 grams of Na$_2$CO$_3$ in 890 c. c. of water) and kept, under rapid stirring, for two hours at about 95 to 100° C. The product was extracted with ether. From the first extraction 60 grams of product were recovered consisting of 27 grams of ethyl ketol and 33 grams of ketol acid condensation products. After acidification the reaction product was again extracted with ether and 100.4 grams of isobutyric acid recovered by evaporation of the solvent. The total recovery was 91%, 62.5% thereof being isobutyric acid or a yield of 56.8% of the theory.

Methyl ethyl acetic acid may be analogously prepared in good yield from chlor methyl propyl ketone or chlor methyl isopropyl ketone.

*Example 2.*—Chlor methyl ethyl ketone was treated with a 3 normal solution of an excess of sodium bicarbonate. The mixture was heated on a water bath with vigorous stirring. The reaction was stopped before substantial ester hydrolysis had taken place. The resulting product was extracted with ether to remove condensation products and a neutral residue was separated from the extracted solution. This was found to contain the ethyl ketol ester of isobutyric acid. By similar procedure the isobutyric acid ester of dimethyl ketol may be prepared from α-chlorethyl methyl ketone; and methyl acetic acid esters of propyl ketol from chlor methyl propyl ketone.

*Example 3.*—282 grams (2 mols) of α, α′ dichlormethyl-ethyl ketone ($CH_2ClCOCHClCH_3$) were added to a saturated solution of 345 grams of sodium carbonate in water while heated for 2½ hours at 90–100° C. The reaction products were recovered as in Example 1, the acidic portion consisting of 79.8 grams of crotonic and iso crotonic acids, which is equal to 46.6% of the theory.

By suitable modification of operating conditions other unsaturated acids may be prepared from similar dihalogenated ketones, for example, angelic acid from α, α′ dichlor methyl isopropyl ketone ($CH_2ClCOCCl(CH_3)_2$), and the like.

By carboxylic compounds, as referred to in the claims, we mean to include the saturated and unsaturated carboxylic acids, their metal salts and their esters.

Our process lends itself readily to the economic preparation of the ketol esters of fatty acids wherein the total carbon atom content is at least eight. The ketonic esters so produced from either mono or polyhalogenated ketones are valuable high boiling liquids of useful solvent properties. These esters may also be used with advantage as plasticizers in lacquer preparation and the like. They are capable of use as intermediates in the synthesis of other valuable compounds and may be hydrolized to yield carboxylic acids and ketols.

While we have in the foregoing described in some detail the preferred embodiments of our invention and some variants thereof, it will be understood that this is only for the purpose of making the invention more clear and that it is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as possible in view of the prior art.

We claim as our invention:

1. A process of producing carboxylic compounds which comprises reacting a halogenated aliphatic ketone of the class consisting of monohalogenated ketones and polyhalogenated ketones containing at least one monohalogenated carbon atom with water in the presence of a basic acting metal compound.

2. A process of producing carboxylic compounds which comprises reacting an aliphatic ketone having at least one monohalogenated carbon atom attached to the carbonyl group with water in the presence of a basic acting metal compound.

3. A process of producing carboxylic compounds which comprises reacting a halogenated aliphatic ketone containing not more than one halogen atom attached to any carbon atom with water in the presence of a basic acting metal compound.

4. A process of producing carboxylic compounds which comprises reacting an aliphatic ketone containing a monohalogenated alkyl group attached to the carbonyl group, with water in the presence of a basic acting metal compound.

5. A process of producing carboxylic compounds which comprises reacting an alpha-halogenated methyl alkyl ketone with water in the presence of a basic acting metal compound.

6. A process of producing carboxylic compounds which comprises reacting a monohalogenated aliphatic ketone with water in the presence of a basic acting metal compound.

7. A process of producing carboxylic compounds which comprises reacting a monohalogenated aliphatic ketone in which the halogen atom is attached to a carbon atom adjoining the carbonyl group, with water in the presence of a basic acting metal compound.

8. A process of producing carboxylic compounds which comprises reacting a dihalogenated aliphatic ketone containing halogen atoms attached to different carbon atoms with water in the presence of a basic acting metal compound.

9. A process of producing carboxylic compounds which comprises reacting a dihalogenated aliphatic ketone containing at least one monohalogenated carbon atom attached to the carbonyl group with water in the presence of a basic acting metal compound.

10. A process of producing carboxylic compounds which comprises reacting an alpha, gamma halogenated methyl alkyl ketone with water in the presence of a basic acting metal compound.

11. A process of producing carboxylic compounds which comprises reacting an aliphatic ketone containing at least one monochlorinated carbon atom with water in the presence of a basic acting metal compound.

12. A process of producing carboxylic compounds which comprises reacting an aliphatic ketone containing at least one monohalogenated carbon atom with water in the presence of a basic acting metal salt.

13. A process of producing carboxylic compounds which comprises reacting an aliphatic ketone containing at least one monohalogenated carbon atom with water in the presence of a basic metal carbonate.

14. A process of producing isobutyric acid which comprises reacting monohalogenated methyl ethyl ketone with water in the presence of a basic acting metal compound of a concentration and at a temperature and for a time at which substantial conversion to said acid is effected.

15. A process of producing a crotonic acid which comprises reacting α, α′ dihalogenated methyl ethyl ketone with water in the presence of a basic acting metal compound of a concentration and at a temperature and for a time at which substantial conversion to said acid is effected.

16. A ketol ester of a fatty acid containing at least four carbon atoms in the acid radical and at least eight carbon atoms and an iso linkage in the molecule.

17. A ketol ester of isobutyric acid.

18. The isobutyric acid ester of a ketol of the empirical formula $C_4H_8O_2$.

19. A ketol ester of a branched chain fatty acid.

20. A process of producing carboxylic compounds which comprises reacting an aliphatic ketone having a monohalogenated carbon atom with water in the presence of a basic acting metal compound.

21. A process of producing carboxylic compounds which comprises reacting an aliphatic ketone having a monohalogenated methyl group with water in the presence of a basic acting metal compound.

22. A process of producing carboxylic compounds which comprises reacting an $\alpha, \alpha'$ halogenated aliphatic ketone with water in the presence of a basic acting metal compound.

MARTIN DE SIMÓ.
SUMNER H. McALLISTER.